United States Patent
Kanjirathinkal et al.

(10) Patent No.: US 11,438,217 B1
(45) Date of Patent: Sep. 6, 2022

(54) STORAGE AREA NETWORK CONNECTIVITY MANAGEMENT USING SWITCH FABRIC CONDITIONS

(71) Applicant: Dell Products L.P., Round Rock, TX (US)

(72) Inventors: Joseph G. Kanjirathinkal, Cary, NC (US); Manikandan Sethuraman, Bangalore (IN); Peniel Charles, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/174,930

(22) Filed: Feb. 12, 2021

(51) Int. Cl.
| | |
|---|---|
| *H04L 41/0668* | (2022.01) |
| *H04L 43/0811* | (2022.01) |
| *H04L 43/0882* | (2022.01) |
| *H04L 49/25* | (2022.01) |
| *H04L 45/00* | (2022.01) |
| *H04L 67/1097* | (2022.01) |

(52) U.S. Cl.
CPC ...... *H04L 41/0668* (2013.01); *H04L 43/0811* (2013.01); *H04L 43/0882* (2013.01); *H04L 45/22* (2013.01); *H04L 49/25* (2013.01); *H04L 67/1097* (2013.01)

(58) Field of Classification Search
CPC ............. H04L 41/0668; H04L 43/0811; H04L 43/0882; H04L 45/22; H04L 49/25; H04L 67/1097
See application file for complete search history.

(56) References Cited

U.S. PATENT DOCUMENTS

| | | | | |
|---|---|---|---|---|
| 6,968,291 | B1* | 11/2005 | Desai | G06F 11/3006 370/254 |
| 7,343,410 | B2* | 3/2008 | Mercier | H04L 67/1097 709/225 |
| 9,143,435 | B1* | 9/2015 | Ramamoorthy | H04L 45/123 |
| 9,258,242 | B1* | 2/2016 | Mallick | H04L 41/5019 |

(Continued)

OTHER PUBLICATIONS https://dl.dell.com/content/docu81241_CloudIQ_Detailed_Review_-_A_Proactive_Monitoring_and_Analytics_Application_for_Dell_EMC_Storage_Systems.pdf?language=en_US, downloaded on Feb. 4, 2021.

(Continued)

*Primary Examiner* — Jerry B Dennison
(74) *Attorney, Agent, or Firm* — Ryan, Mason & Lewis, LLP

(57) ABSTRACT

Techniques are provided for storage area network (SAN) connectivity management using switch fabric conditions. One method comprises ranking switches in a SAN that provides connectivity between host devices and storage arrays, wherein the ranking is based on a port utilization metric for a subset of the switches and/or an evaluation of switch performance degradation events associated with one or more of the switches; evaluating an input/output load of a workload executing on a host device; and determining a path between a given host device and a given storage array through the SAN based on the ranking and the evaluated input/output load of the workload. For a workload being deployed on a new host device, the evaluating may comprise determining an application type of the workload. Alternate switches may be identified based on a comparison of a peak load of a given switch and a peak load of an alternate switch for at least one time period.

20 Claims, 13 Drawing Sheets

(56) References Cited

U.S. PATENT DOCUMENTS

| | | | | |
|---|---|---|---|---|
| 9,946,465 | B1* | 4/2018 | Martin | G05B 13/0265 |
| 10,459,640 | B2* | 10/2019 | Parnell | G06F 11/20 |
| 11,102,300 | B2* | 8/2021 | Charles | G06F 3/0611 |
| 11,175,840 | B2* | 11/2021 | Mallick | G06F 9/545 |
| 11,178,001 | B2* | 11/2021 | Yadav | H04Q 11/04 |
| 2014/0365622 | A1* | 12/2014 | Iyengar | H04L 41/0893 |
| | | | | 709/220 |
| 2020/0162371 | A1* | 5/2020 | Musku | H04L 45/302 |
| 2020/0244766 | A1* | 7/2020 | Farkas | H04L 67/1008 |
| 2020/0326868 | A1* | 10/2020 | Yang | G06F 13/4027 |
| 2020/0348869 | A1* | 11/2020 | Gokam | G06F 13/1642 |
| 2020/0363985 | A1* | 11/2020 | Gokam | G06F 3/0635 |
| 2021/0019160 | A1* | 1/2021 | Pan | G06F 9/45533 |
| 2021/0037057 | A1* | 2/2021 | Suleman | H04L 63/20 |
| 2021/0081247 | A1* | 3/2021 | McBrearty | G06F 9/5033 |
| 2021/0126969 | A1* | 4/2021 | Charles | G06F 3/0611 |
| 2021/0297363 | A1* | 9/2021 | Charles | H04L 47/726 |

OTHER PUBLICATIONS https://www.computerweekly.com/news/2240103791/SAN-overview-Chapter-2-SAN-connectivity, downloaded on Feb. 4, 2021.
CloudIQ Detailed Review, "A Proactive Monitoring and Analytics Application for Dell EMC Storage Systems", Jun. 2019.

* cited by examiner

```
dataset collection identify number of SANs to establish host to storage connectivity
{
identify number of switches in each SAN and its topology
{
for each switch periodically collect health and performance metrics
{
    get switch port utilization percentage
    {
        get total number of usable ports and available healthy ports
        get switch events based on physical component (e.g., Error, Critical and Warning)
    }
    get switch events
    {
        get ISL health stats and utilization alerts
        get Frames discarded
        get Frames with CRC errors
        get Frames transmitted and received stats
        get Link reset
        get Buffer Error
        get Congestion ratio
        get Physical Layer Errors
        get Protocol errors
        get Throughput threshold alerts
        get Time TX Credit Zero
    }
}
}
}
```

```
Providing Connectivity Recommendations When New Server or Infrastructure is Added to Existing SAN
{
    ## collect user input
    get application characteristics
    {
        get type of the application / workload
    }
    get new servers expected utilization trends
    {
        get expected time frame when IO rate is low load level
        get expected time frame when IO rate is moderate load level
        get expected time frame when IO rate is peak load level
    }
    get storage array to which new servers expected to connect
    {
        get storage array target ports
    }

Rank switches based on port utilization and switch events
    ####Switches identified to provide connectivity from host to storage array are assigned with default score (Say 100)
    ####On each polling whenever switch report events which affects switch performance health score is to be reduced.
    rank switches based on current and historic data based on dataset collected over last 24 hours
    {
        ##    Rank based on port availability
        Switch utilization rank
        {
            for each switch()
            {
                total number of available ports
                health metrics of the switch every 30 min
            }
            arrive switch utilization points for each switch() #Note: Switch with more number of available ports will take
            precedence in the rank
        }
        ...
```

FIG. 5B

```
Rank based on switch health
Switch event rank
{
    for each switch()
    {
        ISL health stats and utilization alerts every 30 min
        Time TX Credit Zero every 30 min
        frames discarded every 30 min
        Frames with CRC errors every 30 min
        Frames transmitted and received stats every 30 min
        Link reset every 30 min
        Buffer Error every 30 min
        Congestion ratio every 30 min
        Physical Layer Errors every 30 min
        Protocol errors 30 min
        Throughput threshold alerts 30 min
    }
    if(any performance degradation events reported )
    {
        reduce score for the switch by X percent
    }
    else
    {
        retain the switch score as it is
    }
    arrive switch event rank for each switch every 24 hours()
    #Note: switch with lower number of errors and lower use of bandwidth takes precedence in the ranking
}
```

FIG. 5C

```
Identify the best possible switch for new server load
   recommend best possible connectivity
{
   for each (available switch in SAN)
   {
      if(switch has connectivity to required target port)
      {
         if(number of hops between identified source switch and target port connected switch is 1 && < 4)
         {
            if (Switch Utilization Rank is low)
            {
               if (Switch event rank score is low) #Least rank
               {
                  if(expected time frame when IO rate is peak <= perf stat of switch) #Note: Making
                  sure the switch has enough resource to serve
                     Identify this switch has optimal connectivity option for new workload
               }
               else
               {
                  Next switch
               }
            }
            else
            {
               Next switch
            }
         }
         else
         {
            Next switch
         }
      }
      else
      {
         Next switch
      }
   }
}
```

FIG. 5D

```
Optimal Connectivity Recommendation for Existing Workloads
{
    ## Detecting peak load trend based on collected perf stats detect peak load trend
    {
        for each switch(peak load trend)
        {
            Identify switches in SAN with max utilized stats parameters such as switch
            compute utilization (CPU, memory), max buffer usage, max Congestion, more
            Errors, more Link resets, more ISL utilization
        }
    } finding optimal alternate switch connectivity identify alternate optimal switch connectivity
    {
        for each switch (peak load + time of peak load)
        {
            Analyze other available switch perf stats data
            {
                identify the least utilized switch for the particular time compared with
                affected switch
                if (identified switch peak load < affected switch peak
                load)
                {
                    Validate the identified switch is having connectivity to same
                    target ports with less number of hops
                    if(connection exist)
                    {
                        Validate Switch utilization rank
                        if(Switch utilization rank is less)
                        {
                            Validate Switch event rank
                            if(Switch event rank is less)
                            {
                                Select this switch has optimal
                                connectivity option
                            }
                        }
                    }
                }
            }
        }
    }
    ...
}
```

FIG. 5E 500-6

```
                            }
                          }
                        }
                      }
                    }
                  else {
                  }
                else {
                }                Next available Switch
              else {
              }                Next available Switch
            }
          else {
          }                Next available Switch
                          Next available Switch
⋮
```

FIG. 5F

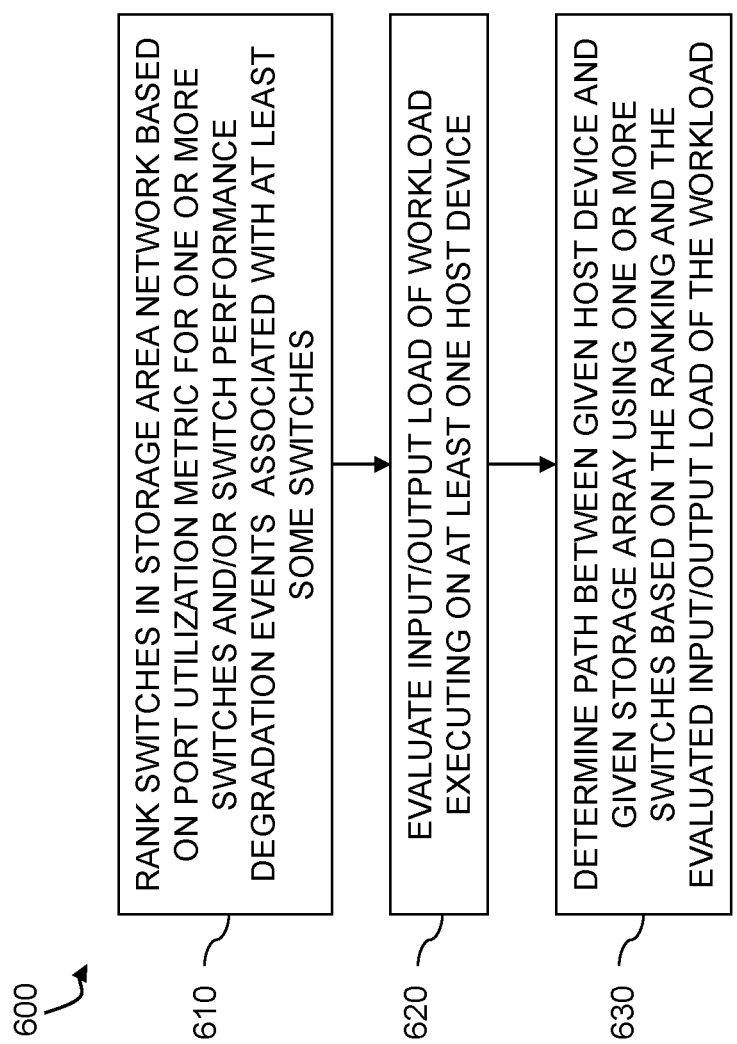

US 11,438,217 B1

STORAGE AREA NETWORK CONNECTIVITY MANAGEMENT USING SWITCH FABRIC CONDITIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to techniques for transferring data in such information processing systems.

BACKGROUND

A storage area network (SAN) employs a switch fabric to connect network nodes using one or more switches. In a large datacenter, for example, connectivity between host devices and storage devices can be complex, and a significant amount of time may be spent by a storage administrator to achieve the best connectivity options. Moreover, evaluating different connectivity options between a given host device and a storage array becomes even more complex when the SAN environment is large and/or when switches from multiple vendors are interconnected.

A need exists for improved techniques for managing connectivity between host devices and storage arrays over a SAN.

SUMMARY

In one embodiment, a method comprises ranking a plurality of switches in a storage area network that provides connectivity between a plurality of host devices and one or more storage arrays, wherein the ranking is based at least in part on one or more of a port utilization metric for each of at least a subset of the switches and an evaluation of one or more switch performance degradation events associated with one or more of the switches; evaluating an input/output load of at least one workload executing on at least one of the host devices; and determining a path between a given host device and a given storage array using one or more of the switches in the storage area network based at least in part on the ranking and the evaluated input/output load of the at least one workload.

In some embodiments, the at least one workload is to be deployed on a host device being added to the plurality of host devices and wherein the evaluating further comprises determining an application type of the at least one workload. In one or more embodiments, the method further comprises identifying at least one of the switches having performance statistics that satisfy one or more performance criteria and identifying an alternate switch for the identified at least one switch based at least in part on a comparison of a peak load of the at least one switch and a peak load of the alternate switch for at least one time period, and further comprising evaluating whether the alternate switch has connectivity to at least one target port of the given storage array.

Other illustrative embodiments include, without limitation, apparatus, systems, methods and computer program products comprising processor-readable storage media.

BRIEF DESCRIPTION OF THE DRAWINGS

FIGS. 5A through 5F, collectively, illustrate exemplary pseudo code for a SAN connectivity management process, according to one embodiment of the disclosure;

FIG. 6 is a flow diagram illustrating an exemplary implementation of a SAN connectivity management process that uses switch fabric conditions to determine a path between a given host device and a given storage array, according to at least some embodiments;

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
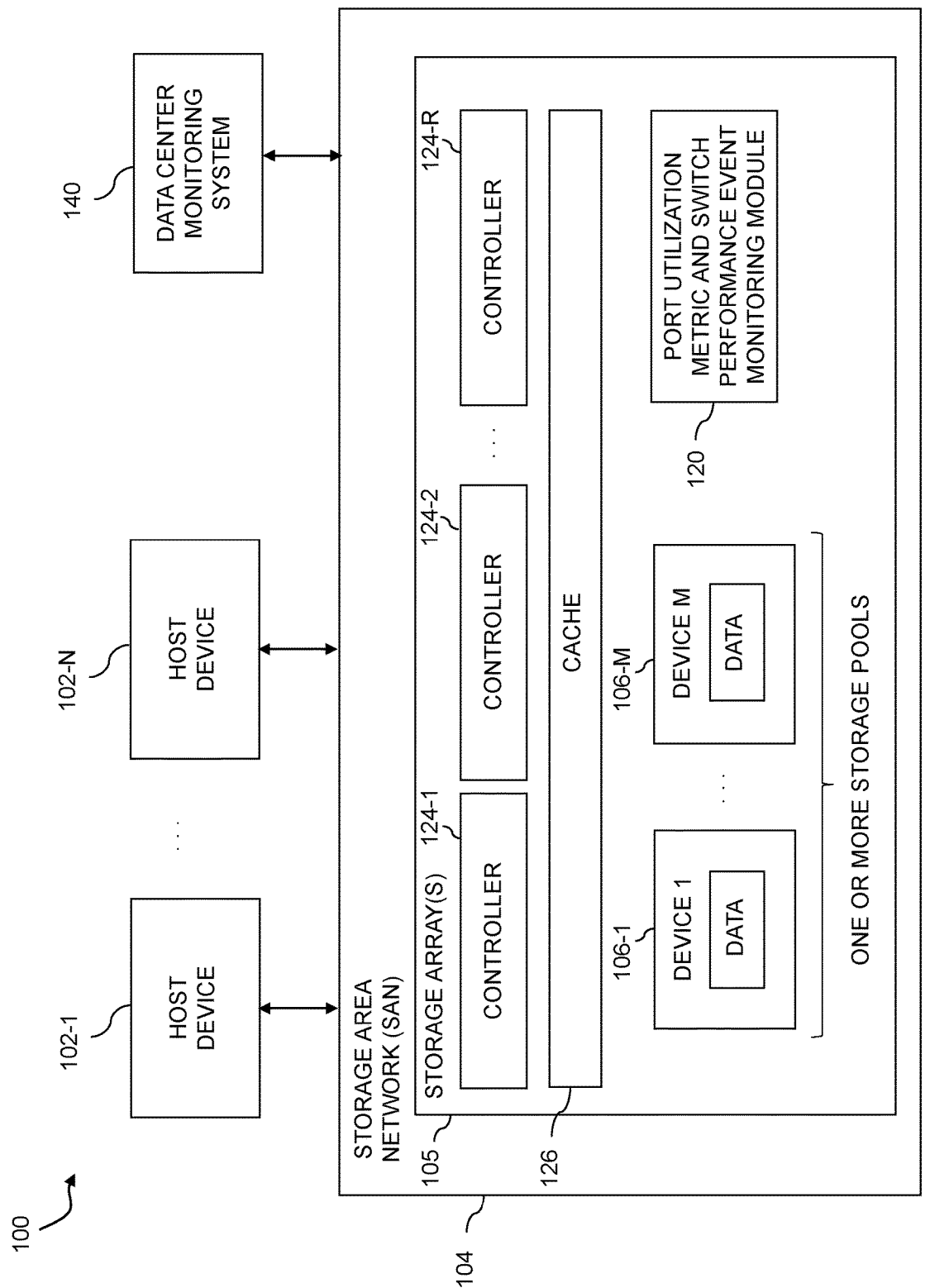
FIG. 1 is a block diagram of an information processing system configured with functionality for SAN connectivity management using switch fabric conditions in an illustrative embodiment.

FIG. 1 shows an information processing system 100 configured in accordance with an illustrative embodiment. The information processing system 100 comprises a plurality of host devices 102-1 through 102-N. The host devices 102 communicate over a SAN 104 with at least one storage array 105. The storage array 105 comprises a plurality of storage devices 106-1 through 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102 and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a Platform-as-a-Service (PaaS) model, although it is to be appreciated that numerous other cloud infrastructure arrangements could be used.

Figure 2:
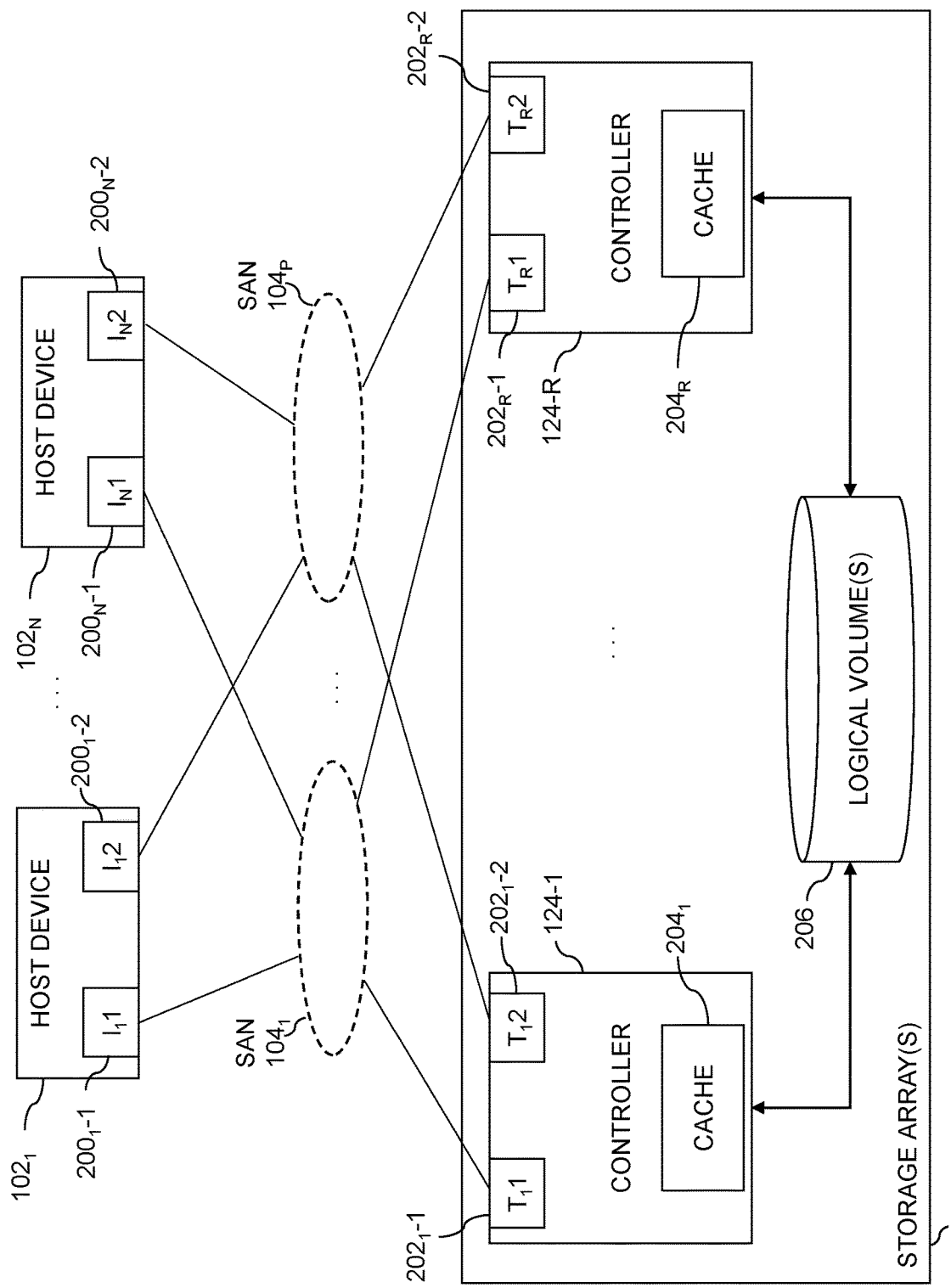
FIG. 2 is a block diagram illustrating SANs that connect between host devices and controllers of the information processing system of FIG. 1 in one or more illustrative embodiments.

The storage devices 106 of the storage array 105 of SAN 104 implement logical volumes (e.g., logical volume(s) 206 of FIG. 2), such as, for example, logical units (LUNs), that are configured to store objects for users associated with the host devices 102. These objects can comprise files, blocks or other types of objects. In illustrative embodiments, the storage devices 106 may comprise one or more clusters of storage devices 106. The host devices 102 interact with the storage array 105 utilizing read and write commands as well as other types of commands that are transmitted over the SAN 104. Such commands in some embodiments more particularly comprise Small Computer System Interface (SCSI) commands or non-volatile memory express (NVMe) commands, although other types of commands can be used in other embodiments. A given IO operation, as that term is broadly used herein, illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical volume. A logical storage device can be defined in the storage array 105 to include different portions of one or more physical storage devices. Storage devices 106 may therefore be viewed as comprising respective LUNs or other logical storage volumes.

Each of the host devices 102 illustratively has one or more IO paths to the storage array 105 using the SAN 104, with at least one of the storage devices 106 of the storage array 105 being visible to that host device on a given one of the paths. A given one of the storage devices 106 may be accessible to the given host device over one or more IO paths. In illustrative embodiments, with reference also to the example of FIG. 2, each of the host devices $102_1$ through 102N comprises one or more hardware bus adapter (HBA) ports 200, e.g., HBA ports $200_1$-1, $200_1$-2, $200_N$-1 and $200_N$-2, which are utilized to communicate with the storage array 105 via one or more SANs $104_1$ through $104_P$. In some embodiments, the HBA ports 200 are referred to as initiators for the IO paths. For example, the HBA port $200_1$-1 of host device $102_1$ may be referred to as initiator 1 ($I_1$1) and the HBA port $200_1$-2 of host device $102_1$ may be referred to as initiator 2 ($I_1$2). HBA ports 200 may comprise any circuitry that is configured to enable communication between the host devices 102 and the storage array 105 or any other devices.

The host devices 102, SAN 104 and storage array(s) 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array(s) 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

Storage array 105 also comprises a plurality of controllers 124-1, 124-2, . . . 124-R and a cache 126. In some embodiments, storage array 105 may comprise one controller 124, two controllers 124 or any other number of controllers 124. In illustrative embodiments, controllers 124 comprise processing devices, memory, or other circuitry that may be used to service input-output operations that are received from the host devices 102. While controllers 124 may be described as comprising particular configurations herein, controllers 124 are not limited to the disclosed embodiments and may comprise any other configuration of electrical and software components that may be utilized to service input-output operations that are received from host devices 102 by storage array 105. With reference also to the example of FIG. 2, in some embodiments, each of the controllers 124 comprises one or more ports 202, which are utilized to communicate with the host devices 102 via the SANs 104.

In the example shown in FIG. 2, controller 124-1 comprises ports $202_1$-1 and $202_1$-2 and controller 124-R comprises ports $202_R$-1 and $202_R$-2. In some embodiments, the ports 202 are referred to as targets for the IO paths. For example, in the illustrated example, the ports $202_1$-1 and $202_1$-2 of controller 124-1 may be referred to as targets 1 ($T_1$1) and 2 ($T_1$2) respectively, and the ports $202_R$-1 and $202_R$-2 of controller 124-R may be referred to as targets 5 ($T_R$1) and 6 ($T_R$2) respectively.

The cache $204_1$ through $204_R$ of each of the controllers 124 comprise one or more memory devices such as, e.g., random access memory (RAM), read-only memory (ROM), flash memory or other types of memory, in any combination.

In some embodiments, cache 126 is a global cache that is separate from and accessible by all of the controllers 124. Cache 126 may comprise one or more memory devices such as, e.g., RAM, ROM, flash memory or other types of memory, in any combination. In some embodiments, the caches 204 of one or more of the controllers 124 may together comprise some or all of cache 126.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

As shown in the example of FIG. 1, the SAN 104 may also be connected to a data center monitoring system 140. In one or more embodiments, the data center monitoring system 140 may be implemented, for example, using at least portions of the functionality provided by the CloudIQ cloud-based monitoring and analytic system from Dell Technologies. In at least some embodiments, the exemplary data center monitoring system 140 recommends connectivity options between a host device 102 and a storage array 105 based on metrics, utilizations, errors, notifications, workload patterns and/or other performance indications that were collected from switches in the SAN 104, as discussed further below.

In at least some embodiments, the storage array 105 comprises a port utilization metric and switch performance event monitoring module 120 that monitors a number of port utilization metrics and switch event notifications, such as link resets, errors, and congestion resets, as discussed herein.

The data center monitoring system 140 may suggest connectivity options when the SAN 104 comprises switches provided by multiple switch vendors. In some embodiments, the data center monitoring system 140 (and/or the port utilization metric and switch performance event monitoring module 120) employs a vendor-neutral implementation that connects to each switch in the SAN 104 using native command sets for each switch, for example, to obtain the port utilization metrics and switch event notifications, such as link resets, errors, and congestion resets, as discussed herein.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as Unity™ or PowerMax™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105.

A storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In one or more embodiments, the disclosed techniques for SAN connectivity management collect data regarding switch fabric conditions from fabric switches themselves and/or from the port utilization metric and switch performance event monitoring module 120. The collected data may comprise, or may be converted to, time-series data. The collected data is analyzed by the data center monitoring system 140 to evaluate port utilization and/or inter-switch link (ISL) utilization, along with event notifications, such as link resets, errors, and congestion reset.

In at least some embodiments, the data center monitoring system 140 identifies alternate connectivity options for each initiator 200 of FIG. 2 to reach the target ports 202 of the one or more storage arrays 105. In this manner, the data center monitoring system 140 can identify different (or alternate) switches that connect one or more initiators 200 and target ports 202 of the storage array(s) 105. In addition, the data center monitoring system 140 may evaluate the hop counts between the one or more initiators 200 and target ports 202 in some embodiments.

For the identified alternate switches that connect the initiators 200 and target ports 202, the data center monitoring system 140 evaluates the overall health of the alternate switches. In some embodiments, the switch health is evaluated based on one or more counters present in each switch, such as cyclic redundancy check (CRC) error, other errors regarding discards, and error timeouts. Generally, more latency results in more timeouts.

In addition, as discussed hereinafter, the data center monitoring system 140 evaluates the time frame(s) when the alternate connections are more optimal. When a new server and/or server workload is being introduced, the application owner may provide details regarding the expected workload and also a peak utilization time frame to the data center monitoring system 140. In this manner, the data center monitoring system 140 can consider the new workload requirements and peak utilization time frame(s) in order to rank the connectivity options available for the new server and thereby identify connectivity options based on the collected details.

Figure 3:
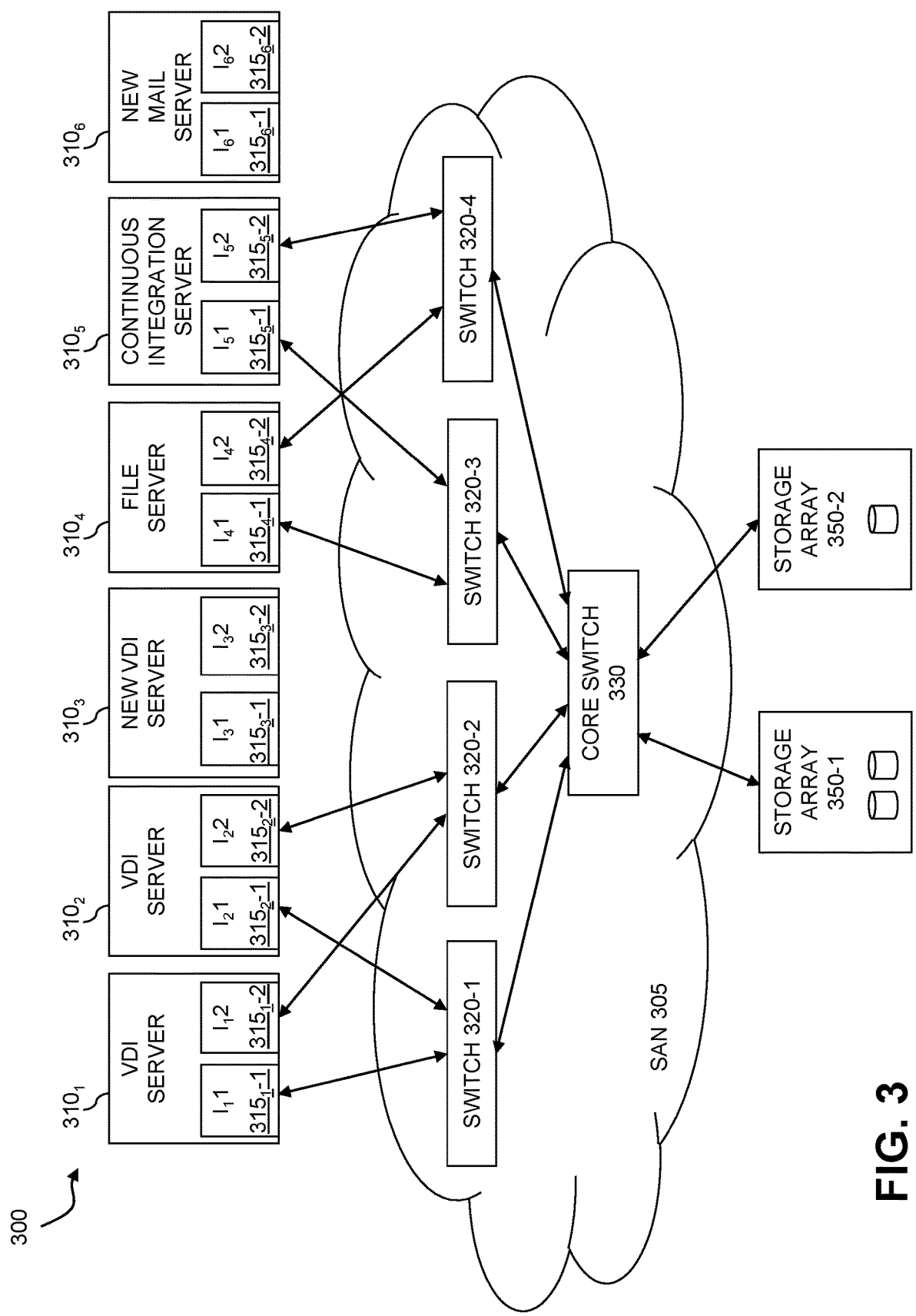
FIGS. 3 and 4 illustrate exemplary SAN environments according to illustrative embodiments of the disclosure.

FIG. 3 illustrates an exemplary SAN environment 300 according to an illustrative embodiment of the disclosure. In the example of FIG. 3, connectivity recommendations are provided by the data center monitoring system 140 of FIG. 1 when a new server or infrastructure is added to an existing SAN fabric. As shown in FIG. 3, the exemplary SAN environment 300 comprises a SAN 305 connecting a plurality of host devices $310_1$ through $310_6$ to two exemplary storage arrays. The SAN 305 comprises a plurality of switches 320-1 through 320-4 and a core switch 330 interconnected in the manner shown in FIG. 3.

In the example of FIG. 3, the host devices 310 are implemented as two existing virtual desktop infrastructure (VDI) servers $310_1$ and $310_2$ executing VDI workloads, a new VDI workload server $310_3$ to be added that will be executing a VDI workload, a file server $310_4$, a continuous integration (CI) server $310_5$ (e.g., a build server) and a new mail server $310_6$ to be added. Each server 310, in at least in some embodiments, comprises HBA ports 315, e.g., HBA ports $315_1$-1, $315_1$-2 through $315_6$-1, $315_6$-2 in the example of FIG. 3, which are utilized to communicate with the storage arrays 350-1 and/or 350-2 via one or more SANs 305. In some embodiments, the HBA ports 315 are referred to as initiators for the IO paths. For example, the HBA port $315_1$-1 of VDI server $310_1$ may be referred to as initiator 1 ($I_1$1) and the HBA port $315_1$-2 of VDI server $310_1$ may be referred to as initiator 2 ($I_1$2). HBA ports 315 may comprise any circuitry that is configured to enable communication between the servers 310 (e.g., host devices) and the storage arrays 350 or any other devices.

It has been observed that the ISL utilizations of the switches 320-1 and 320-2 connected to the VDI servers $310_1$ and $310_2$ are high during typical boot, logon, and logoff times (e.g., from 9:00 AM to 10:00 AM and 5:00 PM to 6:00 PM), whereas the ISL utilizations for the CI server $310_5$, file server $310_4$ and mail server $310_6$ are usually high during the course of a business day (for example, after 10:00 AM until 5:00 PM).

In one or more embodiments, the data center monitoring system 140 of FIG. 1 collects performance statistics for each port from all switches in the SAN 305 and detects a peak load on switch 320-1 and switch 320-2 during boot, login and logoffs time (usually referred to as boot storms/login storms). For switch 320-3 and switch 320-4 that connect to the file server $310_4$ and CI server $310_5$, on the other hand, the peak utilizations are from 10:00 AM to 4:00 PM. The data center monitoring system 140 evaluates the workload requirements for the new VDI server $310_3$ to be introduced in the SAN environment 300 and also evaluates expected peak utilization trends in at least some embodiments. In addition, the data center monitoring system 140 validates the reachability of the host devices (e.g., servers 310) and storage arrays 350 via the switches 320 available in the SAN 305.

The exemplary data center monitoring system 140 recognizes that switch 320-1 and switch 320-2 already have VDI workloads and have peak ISL utilization during a boot storm. Thus, in at least some embodiments, the data center monitoring system 140 recommends to connect the new VDI workload server $310_3$ to switch 320-3 and switch 320-4, while other workloads of the new mail server $310_6$ can be connected to switch 320-1 and switch 320-2, as discussed further below in conjunction with FIGS. 5A through 5F.

Figure 4:
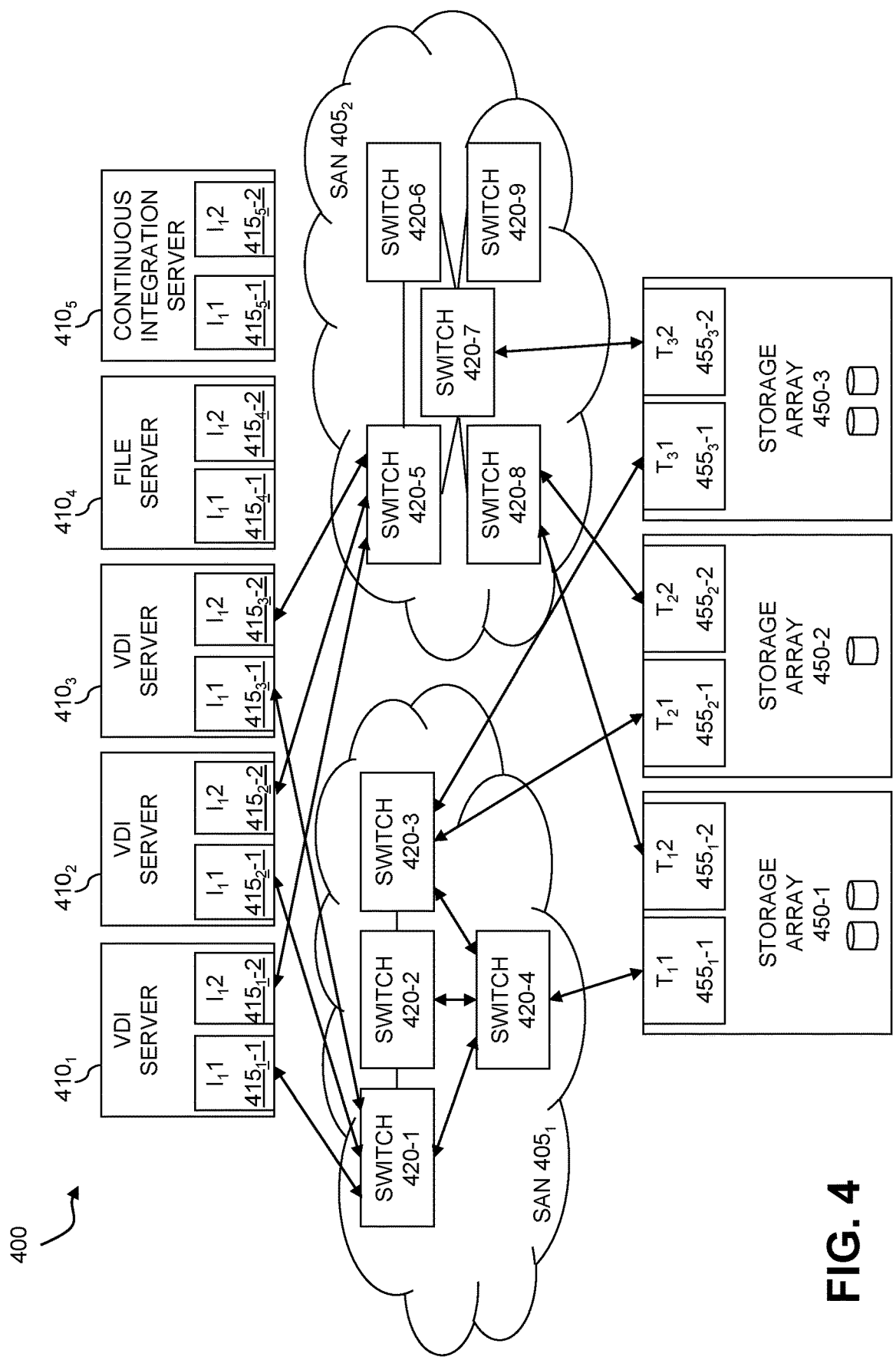

FIG. 4 illustrates another exemplary SAN environment 400 according to an additional illustrative embodiment of the disclosure. In the example of FIG. 4, connectivity recommendations are provided by the data center monitoring system 140 of FIG. 1 based on performance data obtained from fabric switches. As shown in FIG. 4, the exemplary SAN environment 400 comprises two SANs $405_1$ and $405_2$ connecting a plurality of servers $410_1$ through $410_5$ to three exemplary storage arrays 450-1 through 450-3.

The SAN $405_1$ comprises a plurality of switches 420-1 through 420-4 interconnected in the manner shown in FIG. 4. The SAN $405_2$ comprises a plurality of switches 420-5 through 420-9 interconnected in the manner shown in FIG. 4.

In the example of FIG. 4, the host devices 410 are implemented as VDI servers $410_1$ through $410_3$ executing VDI workloads, a file server $410_4$ and a CI server $410_5$ (e.g., a build server). Thus, the exemplary SAN environment 400 comprises servers $410_1$ through $410_3$ with VDI workloads and servers $410_4$ and $410_5$ with file server and continuous integration, respectively, workloads sharing the same switch fabric.

Each server 410, at least in some embodiments, comprises HBA ports 415, e.g., HBA ports $415_1$-1, $415_1$-2 through $415_5$-1 and $415_5$-2 in the example of FIG. 4, which are utilized to communicate with the storage arrays 450-1 through 450-3 via one or more of the SANs 405. In some embodiments, the HBA ports 415 are referred to as initiators for the IO paths. For example, the HBA port $415_1$-1 of VDI server $410_1$ may be referred to as initiator 1 ($I_1$1) and the HBA port $415_1$-2 of VDI server $410_1$ may be referred to as initiator 2 ($I_1$2). HBA ports 415 may comprise any circuitry that is configured to enable communication between the servers 410 (e.g., host devices) and the storage arrays 450 or any other devices.

In the example shown in FIG. 4, storage array 450-1 comprises a controller (not shown in FIG. 4) that comprises ports $455_1$-1 and $455_1$-2 and storage array 450-3 comprises a controller (not shown in FIG. 4) that comprises ports $455_3$-1 and $455_3$-2. In some embodiments, the ports 455 are referred to as targets for the IO paths. For example, in the illustrated example, the ports $455_1$-1 and $455_1$-2 of storage array 450-1 may be referred to as targets 1 ($T_1$1) and 2 ($T_1$2) respectively, and the ports $455_3$-1 and $455_3$-2 of storage array 450-3 may be referred to as targets 5 ($T_3$1) and 6 ($T_3$2) respectively. It is noted that a given storage array 450 may comprise more than two target ports in some embodiments.

One or more aspects of the disclosure recognize that when servers 410 are running with the various workloads, it may be important to understand the bandwidth utilization trends of the workload to achieve a satisfactory (e.g., the most optimal) connectivity portion in the switch fabric. For example, as noted above, in a VDI environment, high port utilization is often observed during boot, logon, and logoff times (e.g., from 9:00 AM to 10:00 AM and 5:00 PM to 6:00 PM), whereas the ISL utilizations for the CI server $410_5$, file server $410_4$ and exchange server (not shown in the example of FIG. 4) are usually high during the course of a business day (for example, after 10:00 AM until 5:00 PM).

In one or more embodiments, the exemplary data center monitoring system 140 performs analytics on performance statistics collected on a per-port basis from the SAN switches 420 of FIG. 4. The data center monitoring system 140 detects a peak load on switch 420-1 and switch 420-2 during boot, login and shutdown times, leading to a performance bottleneck that can impact the time for VDI boot and login events. The exemplary data center monitoring system 140 analyzes the storage array access via alternate switch paths and evaluates alternate switch utilization and performance trends during the same time frame where switch 420-1 and switch 420-2 are reported to have a high utilization, as discussed further below in conjunction with FIGS. 5A through 5F.

In at least some embodiments, the data center monitoring system 140 detects an alternate switch with minimal/moderate utilization trends when compared to switch 420-1 and switch 420-2 from 9:00 AM to 10 AM. Thus, the data center monitoring system 140 can recommend to balance VDI workload servers $410_1$ through $410_3$ connectivity to switch 420-4.

FIGS. 5A through 5F, collectively, illustrate exemplary pseudo code 500-1 through 500-6, respectively, for a SAN connectivity management process that uses switch fabric conditions to determine paths between host devices and storage arrays, according to one embodiment of the disclosure.

As shown in FIG. 5A, the exemplary pseudo code 500-1 collects data, such as identifying a number of SANs 405 that can be used to establish server 410-to-storage array 450 connectivity; identifying a number of switches 420 in each SAN 405 and its topology, and, for each switch 420, periodically collect the health and performance metrics described herein. For example, in some embodiments, the exemplary pseudo code 500-1 collects a switch port utilization percentage (e.g., port utilization based on a total number of usable ports and a number of available healthy ports) and predefined switch events.

As shown in FIG. 5B, the exemplary pseudo code 500-2 collects, e.g., when a new server or infrastructure is added to an existing SAN, user inputs, such as application characteristics, expected utilization trends for new servers 410, and an identification of the storage array 450 to which the new servers 410 are expected to be connected. Thereafter, the exemplary pseudo code 500-2 ranks the switches 420 based at least in part on the collected port utilization (from FIG. 5A).

As shown in FIG. 5C, the exemplary pseudo code 500-3 continues to rank the switches 420 based at least in part on the collected switch event data (from FIG. 5A). Thereafter, the exemplary pseudo code 500-4 of FIG. 5D identifies the best possible switch 420 for a new server load and recommends a satisfactory (e.g., the best possible) connectivity. For example, the exemplary pseudo code 500-4 evaluates, for a given switch, whether the given switch has connectivity to a required target port, a number of hops between an identified source switch and the target port connected switch in a path is between one and four, whether the switch utilization rank and event score are low (e.g., based on a relative ranking of the switches and/or other predefined criteria) and an expected timeframe when the IO rate is at a peak.

As shown in FIG. 5E, the exemplary pseudo code 500-5 is performed, e.g., when a new connectivity recommendation is needed for one or more existing workloads. The exemplary pseudo code 500-5 detects a peak load trend based on collected performance statistics, and finds a satisfactory (e.g., optimal) alternate switch connectivity by identifying at least one alternate switch connectivity. The peak load and time of the peak load are evaluated in some embodiments for each switch, and the performance data of other available switches is evaluated.

The particular processing operations and other system functionality described in conjunction with the pseudo code 500-1 through 500-6 of FIGS. 5A through 5F are presented by way of illustrative example only, and should not be construed as limiting the scope of the disclosure in any way. Alternative embodiments can use other types of processing operations involving host devices, storage systems and logics. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different arrangements within a given information processing system.

FIG. 6 is a flow diagram illustrating an exemplary implementation of a SAN connectivity management process 600 that uses switch fabric conditions to determine a path between a given host device and a given storage array, according to at least some embodiments. In the example of FIG. 6, the switches 420 in a SAN 405 are ranked in step 610 based at least in part on a port utilization metric for one or more switches and/or one or more switch performance degradation events associated with at least some of the switches. The term "ranking" as used herein is intended to be broadly construed so as to encompass, by way of illustration and without limitation, determining a relative position of at least a subset of the switches (e.g., to determine a position of one or more switches in relation to one or more additional switches based on performance or other characteristics), identifying a top-N set of switches, assigning one or more switches to one or more categories or classes of switches, or any other relative evaluation or assessment of at least a subset of switches. The term "ranking" thus shall not be construed to require any particular ordering, such as an ordinal ranking, or placing the switches in a specified order or arrangement in a series, as would be apparent to a person of ordinary skill in the art.

In one or more embodiments, the port utilization metric for each switch may comprise a switch port utilization percentage (e.g., a port utilization based on a total number of usable ports and a number of available healthy ports). In some embodiments, the one or more switch performance degradation events evaluated in step 610 may comprise, for example, an inter-switch link health statistic and utilization alert event; a frames discarded event; a frames with cyclic redundancy check event; a number of frames transmitted and received statistic; a link reset event; a buffer error event; a congestion ratio statistic; a physical layer error event; a protocol error event; a throughput threshold alert event; and/or a transmission time credit event.

In step 620, the input/output load of a workload executing on at least one host device is evaluated. Finally, in step 630, a path between a given host device and a given storage array using one or more of the switches 420 is determined based on the ranking and the evaluated input/output load of the workload.

The particular processing operations and other network functionality described in conjunction with the flow diagram of FIG. 6, for example, are presented by way of illustrative example only, and should not be construed as limiting the scope of the disclosure in any way. Alternative embodiments can use other types of processing operations to provide SAN connectivity management using switch fabric conditions. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

It has been observed that existing techniques send all failed units for diagnostics since it is not known whether the failure is a hardware or software failure. The diagnostics process can add significant time that will impact the overall cycle time, reduce productivity and/or increase labor costs.

Among other benefits, the disclosed techniques for SAN connectivity management using switch fabric conditions can suggest satisfactory (e.g., optimal) connectivity options. In some embodiments the suggested connectivity options are based at least in part on an evaluation of IO workload, port utilizations, errors and other factors. While existing vendor-specific solutions may identify potential causes for connectivity problems, such solutions do no suggest alternate connectivity options. In addition, the disclosed techniques for SAN connectivity management can suggest connectivity options even when the network environment includes switches from multiple vendors.

One or more embodiments of the disclosure provide improved methods, apparatus and computer program products for SAN connectivity management using switch fabric conditions. The foregoing applications and associated embodiments should be considered as illustrative only, and numerous other embodiments can be configured using the techniques disclosed herein, in a wide variety of different applications.

It should also be understood that the disclosed SAN connectivity management techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for SAN connectivity management using switch fabric conditions may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based SAN connectivity management engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based SAN connectivity management platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
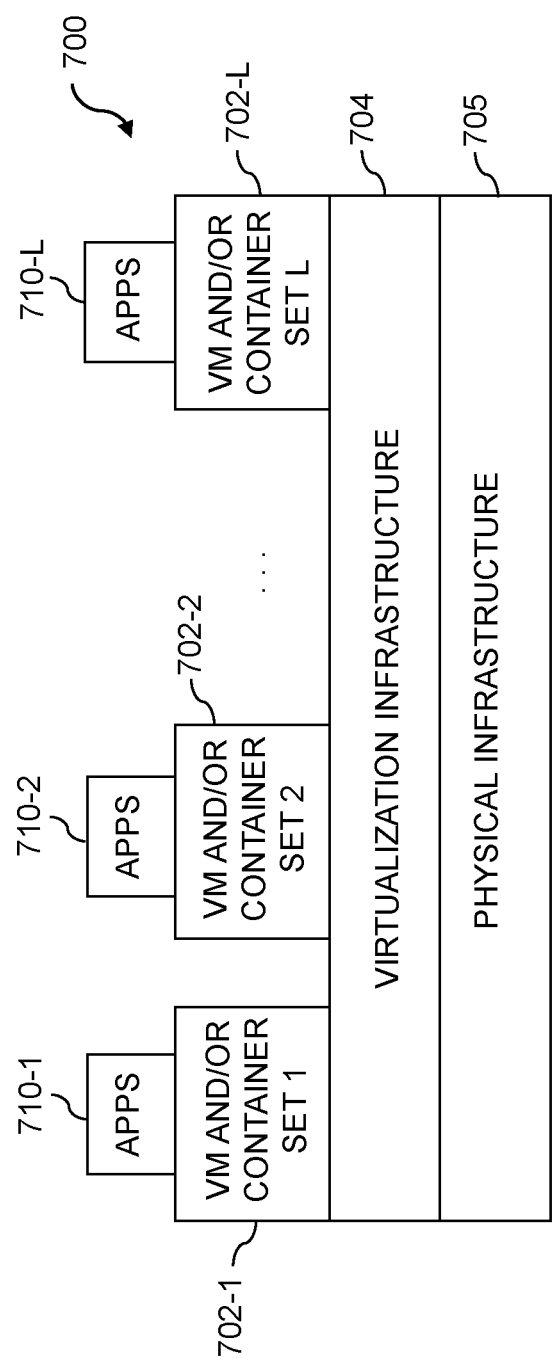
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple VMs and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide SAN connectivity management functionality of the type described above for one or more processes running on a given one of the VMs. For example, each of the VMs can implement SAN connectivity management control logic and associated workload evaluation functionality for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide SAN connectivity management functionality of the type described above for one or more processes running on different ones of the containers. For example, a container host device supporting multiple containers of one or more container sets can implement one or more instances of SAN connectivity management control logic and associated workload evaluation functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a WAN, a LAN, a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an ASIC, an FPGA or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
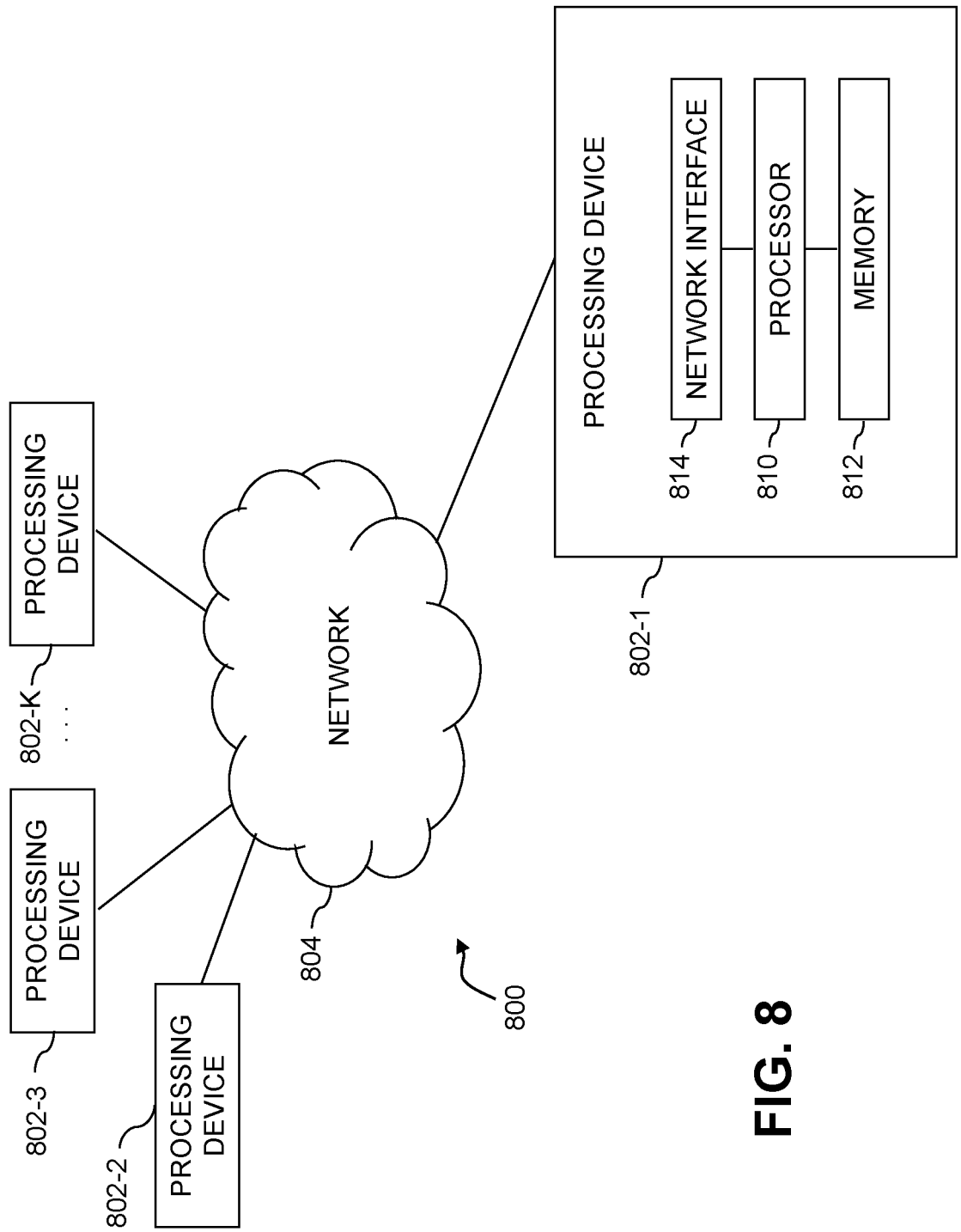
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
ranking a plurality of switches in a storage area network that provides connectivity between a plurality of host devices and one or more storage arrays, wherein the ranking is based at least in part on a first ranking that evaluates a port utilization metric for each of at least a subset of the switches and a second ranking that evaluates one or more switch performance degradation events associated with one or more of the switches, wherein the port utilization metric for a given switch of the plurality of switches is based at least in part on a number of available ports associated with the given switch;
evaluating an input/output load of at least one workload executing on at least one of the plurality of host devices; and
determining a path between a given host device and a given storage array by identifying one or more of the switches in the storage area network for the path, wherein the identifying the one or more of the switches in the storage area network for the path is based at least in part on the first ranking, the second ranking and the evaluated input/output load of the at least one workload;
wherein the method is performed by at least one processing device comprising a processor coupled to a memory.

2. The method of claim 1, wherein the at least one workload is to be deployed on a host device being added to the plurality of host devices and wherein the evaluating further comprises determining an application type of the at least one workload.

3. The method of claim 1, wherein the evaluating the input/output load of the at least one workload comprises evaluating an input/output load level of the at least one workload for one or more time periods.

4. The method of claim 1, wherein the ranking further comprises evaluating a number of inter-switch link hops between an identified source switch and the given storage array.

5. The method of claim 1, wherein the one or more switch performance degradation events comprise one or more of: an inter-switch link health statistic and utilization alert event; a frames discarded event; a frames with cyclic redundancy check event; a number of frames transmitted and received statistic; a link reset event; a buffer error event; a congestion ratio statistic; a physical layer error event; a protocol error event; a throughput threshold alert event; and a transmission time credit event.

6. The method of claim 1, wherein the ranking further comprises identifying one or more of the switches that provide connectivity between the given host device and the given storage array.

7. The method of claim 1, further comprising identifying at least one of the switches having performance statistics that satisfy one or more performance criteria and identifying an alternate switch for the identified at least one switch based at least in part on a comparison of a peak load of the at least one switch and a peak load of the alternate switch for at least one time period.

8. The method of claim 7, further comprising evaluating whether the alternate switch has connectivity to at least one target port of the given storage array.

9. An apparatus comprising:
at least one processing device comprising a processor coupled to a memory;
the at least one processing device being configured to implement the following steps:
ranking a plurality of switches in a storage area network that provides connectivity between a plurality of host devices and one or more storage arrays, wherein the ranking is based at least in part on a first ranking that evaluates a port utilization metric for each of at least a subset of the switches and a second ranking that evaluates one or more switch performance degradation events associated with one or more of the switches, wherein the port utilization metric for a given switch of the plurality of switches is based at least in part on a number of available ports associated with the given switch;

evaluating an input/output load of at least one workload executing on at least one of the plurality of host devices; and determining a path between a given host device and a given storage array by identifying one or more of the switches in the storage area network for the path, wherein the identifying the one or more of the switches in the storage area network for the path is based at least in part on the first ranking, the second ranking and the evaluated input/output load of the at least one workload.

10. The apparatus of claim 9, wherein the at least one workload is to be deployed on a host device being added to the plurality of host devices and wherein the evaluating further comprises determining an application type of the at least one workload.

11. The apparatus of claim 9, wherein the evaluating the input/output load of the at least one workload comprises evaluating an input/output load level of the at least one workload for one or more time periods.

12. The apparatus of claim 9, wherein the ranking further comprises evaluating a number of inter-switch link hops between an identified source switch and the given storage array.

13. The apparatus of claim 9, wherein the ranking further comprises identifying one or more of the switches that provide connectivity between the given host device and the given storage array.

14. The apparatus of claim 9, further comprising identifying at least one of the switches having performance statistics that satisfy one or more performance criteria and identifying an alternate switch for the identified at least one switch based at least in part on a comparison of a peak load of the at least one switch and a peak load of the alternate switch for at least one time period, and further comprising evaluating whether the alternate switch has connectivity to at least one target port of the given storage array.

15. A non-transitory processor-readable storage medium having stored therein program code of one or more software programs, wherein the program code when executed by at least one processing device causes the at least one processing device to perform the following steps:

ranking a plurality of switches in a storage area network that provides connectivity between a plurality of host devices and one or more storage arrays, wherein the ranking is based at least in part on a first ranking that evaluates a port utilization metric for each of at least a subset of the switches and a second ranking that evaluates one or more switch performance degradation events associated with one or more of the switches, wherein the port utilization metric for a given switch of the plurality of switches is based at least in part on a number of available ports associated with the given switch;

evaluating an input/output load of at least one workload executing on at least one of the plurality of host devices; and determining a path between a given host device and a given storage array by identifying one or more of the switches in the storage area network for the path, wherein the identifying the one or more of the switches in the storage area network for the path is based at least in part on the first ranking, the second ranking and the evaluated input/output load of the at least one workload.

16. The non-transitory processor-readable storage medium of claim 15, wherein the at least one workload is to be deployed on a host device being added to the plurality of host devices and wherein the evaluating further comprises determining an application type of the at least one workload.

17. The non-transitory processor-readable storage medium of claim 15, wherein the evaluating the input/output load of the at least one workload comprises evaluating an input/output load level of the at least one workload for one or more time periods.

18. The non-transitory processor-readable storage medium of claim 15, wherein the ranking further comprises evaluating a number of inter-switch link hops between an identified source switch and the given storage array.

19. The non-transitory processor-readable storage medium of claim 15, wherein the ranking further comprises identifying one or more of the switches that provide connectivity between the given host device and the given storage array.

20. The non-transitory processor-readable storage medium of claim 15, further comprising identifying at least one of the switches having performance statistics that satisfy one or more performance criteria and identifying an alternate switch for the identified at least one switch based at least in part on a comparison of a peak load of the at least one switch and a peak load of the alternate switch for at least one time period, and further comprising evaluating whether the alternate switch has connectivity to at least one target port of the given storage array.

* * * * *